United States Patent [19]
Straubel et al.

[11] Patent Number: 6,024,082
[45] Date of Patent: Feb. 15, 2000

[54] OUTDOOR COOKING DEVICE

[76] Inventors: Jeffrey N. Straubel, 3384 Wimbledon Way, Costa Mesa, Calif. 92626; David A. Klein, 12591 Charloma Dr., Tustin, Calif. 92780

[21] Appl. No.: 09/115,851

[22] Filed: Jul. 15, 1998

[51] Int. Cl.[7] .................................................. F24C 3/00
[52] U.S. Cl. ........................................ 126/41 R; 126/25 R
[58] Field of Search ................................. 126/41 R, 45 R

[56] References Cited

U.S. PATENT DOCUMENTS

| | | | |
|---|---|---|---|
| 3,561,420 | 2/1971 | Paolella | 126/25 R |
| 3,915,146 | 10/1975 | Bauer | 126/41 R |
| 4,702,224 | 10/1987 | Griffith | 126/8 |
| 4,924,846 | 5/1990 | Peacock et al. | 126/41 R |
| 5,076,257 | 12/1991 | Raymer et al. | 126/41 R |
| 5,261,386 | 11/1993 | Burkhart | 126/25 R |
| 5,333,596 | 8/1994 | Clifford | 126/41 R |
| 5,343,851 | 9/1994 | Cusson | 126/4 |
| 5,452,707 | 9/1995 | Harris et al. | 126/41 R |
| 5,505,190 | 4/1996 | Kalenian | 126/41 R |
| 5,809,988 | 9/1998 | Wagner | 126/25 R |

*Primary Examiner*—Carroll Dority
*Attorney, Agent, or Firm*—Christie, Parker & Hale, LLP

[57] ABSTRACT

An outdoor-type cooking device for the heating and cooking of foods is disclosed. The cooking device comprises a base with a support housing extending upwardly to support a grilling enclosure. The grilling enclosure includes a cooking surface and a removable hood. The support housing is made from a non-metal material which is molded into a hollow thin walled structure. The support housing may be configured to have a decoratively shaped exterior. In addition, the support housing forms a working surface adjacent the cooking surface. The base forms a ground engaging support base as well as providing support for a fuel canister. The hollow support housing is also adapted to support and house the fuel canister. The removable hood is configured to cover the cooking surface and has a front and rear surface which extend between two spaced apart sides. A pair of spaced apart and axially aligned hinge assemblies pivotally couple the hood about the grilling enclosure and allow the hood to open and close over the cooking surface. In addition, the hinge assemblies allow the hood to be readily removed and reattached without any special tools or special handling.

17 Claims, 7 Drawing Sheets

OUTDOOR COOKING DEVICE

FIELD OF THE INVENTION

This invention relates to outdoor-type cooking devices and more particularly, to a gas barbecue grill having an improved support stand and grilling apparatus.

BACKGROUND

Conventional gas barbecues include a grilling enclosure which is typically supported by a support stand or frame structure on a base. The grilling enclosure forms a housing which safely supports at least one burner adjacent a cooking surface and a cover or hood which is used to cover the cooking surface and enclose the grilling enclosure. The support stand supports the grilling enclosure at a generally comfortable working height and comes in a number of differing configurations depending on the type and style of barbecue. The base, which is also provided in a number of differing variations depending on the requirements of the support stand, is used to provide a sturdy platform for engaging the ground or other support surface. Because most conventional barbecues are designed for portability, the entire unit is designed to be lightweight and the base is commonly supported, at least in part, by wheels. Other components typically supplied with conventional barbeques include burner controls and a supply of a fuel, such as LP gas (liquid propane) or other similar fuel.

In one configuration, the conventional barbecue has a support stand which comprises a relatively small diameter tubular pipe structure that extends between the base and the grilling enclosure. The use of a small support stand requires a relatively small base and thus, requires a relatively small footprint at the desired storage or use location. In addition, this arrangement is highly portable and allows for relatively simple assembly of the barbecue by the retailer or purchaser. In an effort to make the barbecue as portable as possible, the support structure and base are typically made as lightweight as possible. However, these "post" style barbecues, with the grilling enclosure at the top of a relatively small diameter supporting structure, results in a top heavy arrangement which is somewhat unsturdy and has potential tip over problems. These problems are magnified during movement, when the fuel container is removed from the base and additionally, when the hood to the grilling enclosure is opened. In addition, the barbecue is often equipped with side shelves and condiment racks which further reduces sturdiness and adds to the tip over potential. Attempts to correct these problems have lead to the use of heavier and thicker structural components and a larger diameter base, all of which result in increased costs, decreased portability and a generally unattractive barbecue.

In another configuration, the support stand comprises a metal framework which extends upwardly from the base to support the grilling enclosure. The framework commonly consists of four support members at each corner of the base. This configuration tends to be more stable than the single post type arrangement and provides better protection for the fuel container and burner controls. In addition, side panels can easily be added to protect and hide the fuel container. However, like the previously described post supported grilling enclosure, this framed arrangement is difficult to clean and tends to poorly withstand the outdoor environment. As such, dirty, corroded and broken components, including the structural stand itself, is common among gas barbecues of these configuration.

In an effort to increase the rigidity and durability of the supporting structure as well as the overall cleanliness and look of the barbecue, modern barbecue support stands often comprise a relatively smooth metal box structure which forms a base at the lower end and extends upwardly to support and even form the grilling enclosure. Typically, this arrangement is made from a folded sheet of a metal to create a walled housing which surrounds the fuel container and associated plumbing and supports the grilling enclosure. In order to reduce corrosion and enhance portability and weight, a thin gage stainless steel is commonly used. However, aluminum and steels which have been treated and painted are also used and are also sufficiently lightweight to be portable. These metal materials provide a smooth, easy to clean surface. However, these materials and particularly, the stainless steel are expensive to make and assemble, resulting in a relatively expensive barbecue. In addition, these materials and particularly, the stainless steel, have a unique appearance which is not always desirable and can easily scratch or even dent to leave a visible mark that is very difficult to repair. Metal barbecues also tend to rust or otherwise corrode, leading to quickly worn parts and poor appearance. Even the stainless steel units tend to lose their luster over time, leading to a worn looking barbecue.

In addition to the disadvantages described above, each of these variations of support stands and barbecues shares the common additional disadvantage of having a generally identical appearance which is not universally enjoyed. In particular, each variation of the conventional barbecue has a distinctive appearance that is all too common. These limited variations of appearances rarely matches a user's tastes and even less often match the actual place of use, including an adjacent home, deck and furniture. Because these conventional barbecues are typically considered unattractive and are often difficult to clean, they are often stored when not in use. However, storage requires additional effort before and after each use as well as requiring storage space. In an effort to overcome these problems, a few modern barbecues have been designed with removable side panels having a metal, wood and cloth exterior which may be somewhat tailored to the user's tastes. However, these panels require an additional assembly step and are limited to variations of the panel alone. Thus, there is a need for a barbecue which is sturdy and has the advantages of modern metal walled barbecues but which does not corrode or wear like these conventional barbecues. There is also a need for such a barbecue which has variety of differing appearances to better match a particular user's taste and location of actual use.

SUMMARY

The present invention overcomes the aforementioned problems by providing an outdoor style cooking device having a hollow support structure made from a lightweight non-metal material. The non-metal material provides a smooth outer surface which does not rust or otherwise corrode. The smooth outer surface provides a relatively sanitary and easy to clean surface. In addition, the non-metal material can be readily formed to construct a barbecue having most any appearance and exterior design. This allows the present outdoor cooking device to advantageously be constructed to better match a user's specific taste and location of actual use.

The present invention is directed to a cooking device for the heating and cooking of foods. The cooking device comprises a base with a support housing extending upwardly to support a barbecue-type grilling enclosure. The grilling enclosure includes a cooking surface and a pivotally coupled hood assembly. The support housing is made from a non-metal material which is formed into a hollow walled structure having an average wall thickness of at least approximately 0.2 inches and preferably less than about 2.5 inches. The base forms a ground engaging support for the cooking device as well as providing a support base for a fuel container. The hollow support housing is also adapted to support and house the fuel container and associated components. The hood is configured to cover the cooking surface and has a front and rear surface which extend between two spaced apart sides.

In another aspect of the present invention, the cooking device is an outdoor style gas barbecue with the support housing constructed from a relatively thin layer of a concrete material. The concrete material is a lightweight glass-fiber reinforced concrete including a mixture of cement, sand, water and fibers. In addition, coloring is added to the concrete material to provide a colored effect. The concrete is worked into a preformed mold and cured to form a support housing having a decorative exterior shape and finish.

In another aspect of the present invention, the cooking device includes a support housing having an access door made from the same non-metal material as the support housing. The access door is constructed to appear as a continuous part of the support housing and provides access into the hollow interior. The access door is further configured with a decorative exterior surface to match the exterior surface of the adjacent support housing.

In yet another aspect of the present invention, the cooking device includes a unique hinge assembly which allows the hood to be removed from over the cooking surface and reattached without the use of tools or other equipment. In this aspect of the invention, a pair of spaced apart and axially aligned hinge assemblies pivotally couple the hood about the grilling enclosure. The hinge assemblies are adapted to allow the hood to be pivoted open and closed as well as removed and reattached without any special tools or handling.

These and other features and advantages of the invention will be apparent to those of ordinary skill in the art in view of the detailed description of the preferred embodiments, which is made with reference to the drawings, a brief description of which is provided below.

DETAILED DESCRIPTION OF THE PREFERRED EMBODIMENTS

Figure 1:
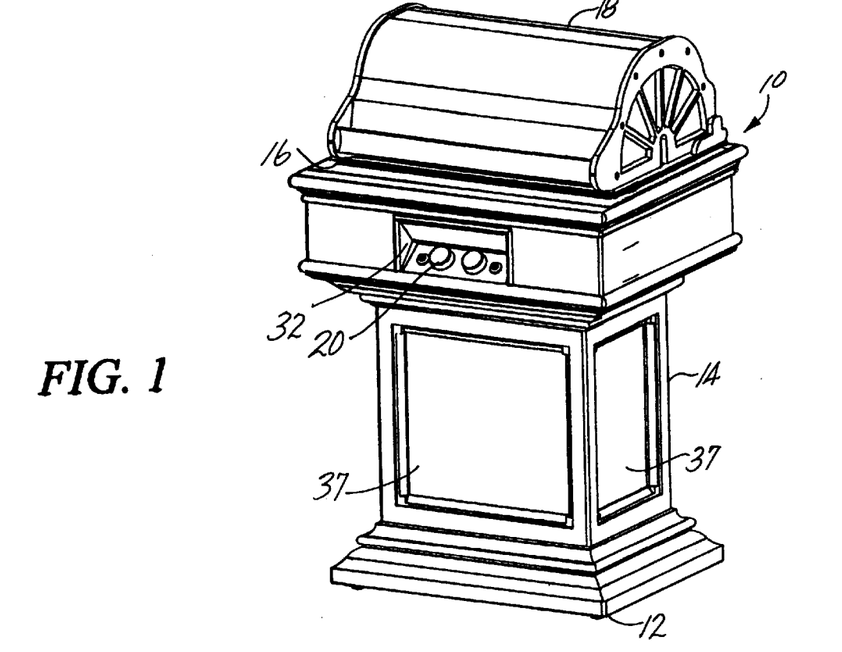
FIG. 1 is a perspective view of an embodiment of an outdoor cooking device constructed according to the principles of the present invention.

Referring now to the drawings, wherein like reference numerals designate like parts throughout the several views and embodiments, an outdoor cooking device is illustrated in FIG. 1 and designated by reference numeral 10. As shown, the outdoor cooking device 10, which is typically called a barbecue, includes a support base 12, a support housing 14 and a grilling enclosure 16. The support housing 14 extends upwardly from the supporting base 12 to support the grilling enclosure 16 at a comfortable working level. The grilling enclosure 16 further includes a cover or hood 18 which is pivotally coupled to the grilling enclosure. Controls 20 are provided for operation of the cooking device 10.

Figure 2:
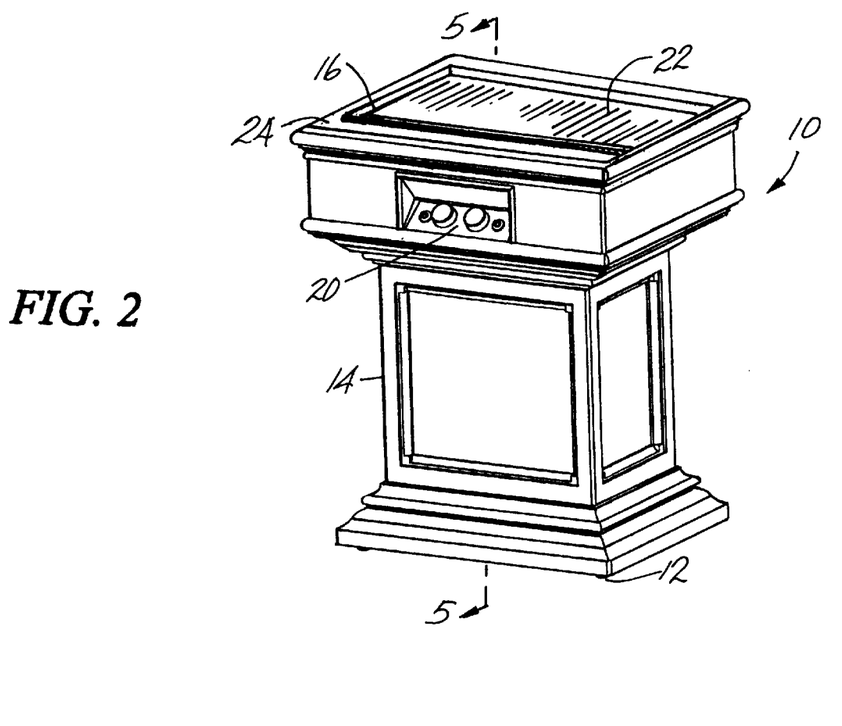
FIG. 2 is a perspective view of the cooking device of FIG. 1 showing the grilling enclosure.

Referring now to FIG. 2, the cooking device 10 is shown with the hood (reference numeral 18, FIG. 1) removed. As illustrated, the grilling enclosure 16 further includes and supports a cooking surface 22 which is adapted for the actual heating and cooking of foods. This cooking surface 22 may be a grill-type cooking surface including a warming grill or alternatively, any other type of cooking surface or surfaces as are known to those of skill in the art of outdoor style cooking. Preferably, the support housing 14 surrounds the grilling enclosure 16 to support the burner controls 20 and to form a working surface 24 adjacent the cooking surface 22. The size of the working surface 24 is variable, depending on the size of the surrounding support housing 14. Alternatively, the support housing 14 may extend upwardly to surround only a lower portion of the grilling enclosure 16 or even be a pedestal type support coupled to the base of the grilling enclosure. Alternatively, the support housing 14 may surround a plurality of grilling enclosures 16 to form a multi-grill cooking device.

Figure 3:
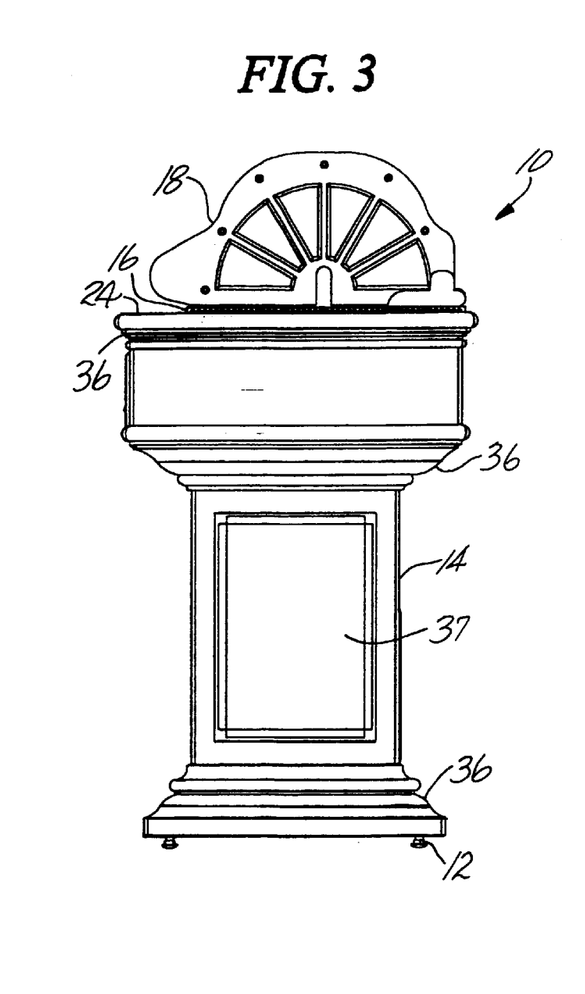
FIG. 3 is a side view of the cooking device of FIG. 1.
Figure 4:
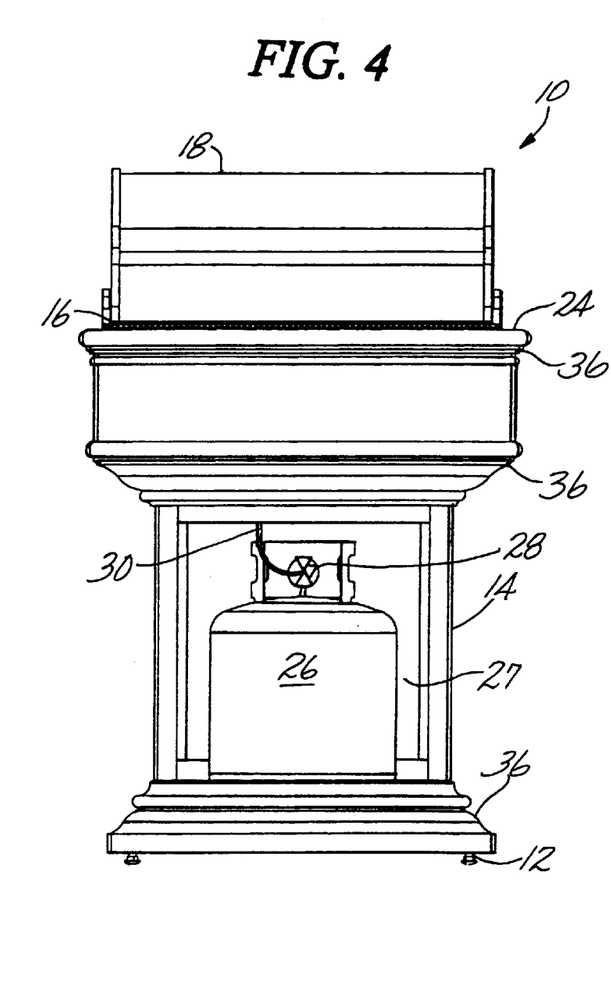
FIG. 4 is a rear view of the cooking device of FIG. 1.

Referring now to FIGS. 1 and 3–4, the cooking device 10 will be described in greater detail. As illustrated, the support housing 14 forms a relatively thin walled hollow structure which is adapted to receive and support a fuel canister 26, such as a conventional propane tank. Preferably, the housing 14 includes an opening 27 within at least one of the side or rear walls for receiving the fuel canister 26. A valve 28 and supply line 30 interconnect the fuel to the controls 20 and onto the associated burners (not shown). The fuel supply line 30 may also be directly interconnected with a larger or fixed supply of fuel, such as natural gas, and as is known to those of skill in the art.

Although shown with burner controls 20 incorporated into the support housing 14, the cooking device 10 may be a fuel-less type barbecue without any controls. In this configuration, the support housing 14 may be configured without a special recess 32 for supporting and protecting the controls 20, as best illustrated in FIG. 1. Without a fuel supply and burners, the cooking device 10 may be adapted for burning charcoal or similar fuel as is conventionally known. Alternatively, the burner controls 20 may be of any type or style and be located at any position on the support housing 14, grilling enclosure 16 or even the hood 18 as understood to those with skill in the art of constructing gas barbecues. The controls 20 are used to both ignite and adjust the flow of fuel to the burner as is also conventionally known.

As illustrated, the support housing 14 surrounds a substantial portion of the supporting base 12 as well as lower and side surfaces of the grilling enclosure 16. This configuration provides a contiguous exterior surface which is both aesthetic and facilitates cleaning. With the hood 18 closed, the cooking device 10 may be quickly and effectively cleaned with a simple hosing-off and wipe down. By surrounding and covering the base 12 and the grilling enclosure 16 with the support housing 14, the presence of sharp and potentially dangerous edges is reduced. In addition, the high temperatures associated with the grilling enclosure 16 may be insulated by the surrounding support housing 14. A separate insulation may be used or alternatively, the grilling enclosure 16 may be simply spaced apart from the surrounding housing 14.

In order to enhance the functionality and appearance of the cooking device 10, the support housing 14 is formed to have a unique shape. This shape may be advantageously configured for mass production and aesthetics or merely custom tailored for specific applications. When utilizing the preferred materials as will be described following, the support housing 14 may be formed to most any shape imaginable, from a simple rectangular support to one having multiple curved surfaces. In addition to the unique shape, the exterior surface of the support housing 14 may be formed to have a decorative outer features 36.

In the illustrated embodiment, the support housing 14 is formed to have the shape and appearance of a classic piece of furniture, including having inset panels 37 and molding like features 36 adjacent the base 12 and the working surface 24. The non-metal material has been formulated and finished to have an outer surface which is smooth and polished in appearance and allows for easy wash-down. In addition, the housing 14 has a smaller cross-section below the grilling enclosure 16 to facilitate working over the cooking surface 22 and provide leg room. However, the support housing may advantageously be formed to have almost any shape or look, including being constructed to match associated furnishings such as plant pots, yard furniture and the like.

Figure 5:
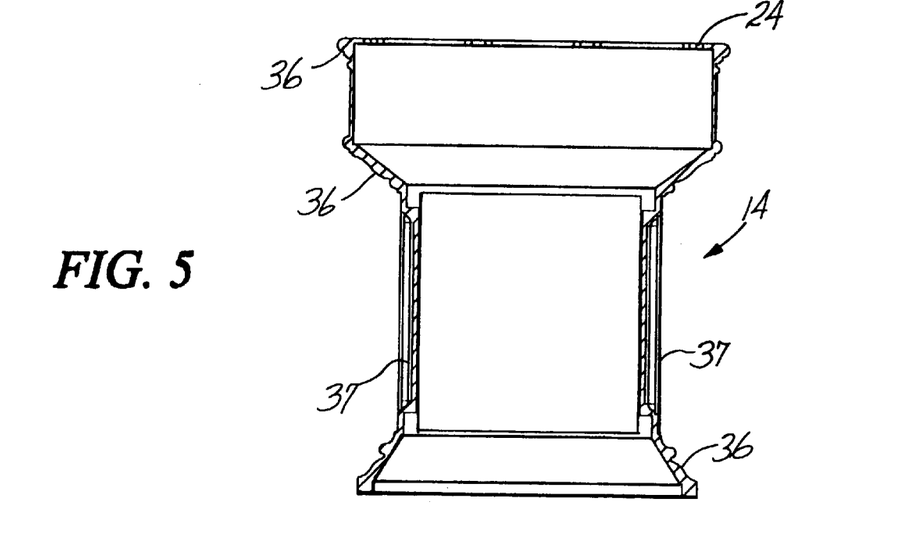
FIG. 5 is a cross sectional view of the cooking device of FIG. 2 taken along lines 5—5.

Referring now to FIG. 5, the support housing 14 will be described in greater detail. As shown, the support housing 14 forms a generally hollow supporting structure which extends upwardly from the base 12 to the grilling enclosure 16. Preferably, the support housing 14 and the supporting base 12 are coupled together to form a single component. As illustrated, the support housing is configured to fit over and substantially cover the supporting base 12. The supporting base 12 may then be securely attached to the support housing 14. Although this is not required, covering the base 12 with the support housing 14 generally provides a safer and more aesthetic appearance. Similarly, the support housing 14 may extend upwardly to surround at least a portion of the grilling enclosure 16. As also illustrated, the support housing 14 is configured with an opening adapted to receive the grilling enclosure 16. As previously described, the support housing 14 may be configured to form the actual grilling enclosure 16 or alternatively, be spaced apart from the enclosure 16. By surrounding both the base 12 and the grilling enclosure 16, the support housing advantageously provides a more uniform and aesthetic exterior appearance while insulating the grilling enclosure 16 and providing a working surface 24.

The support housing 14 is constricted of a relatively thin shell of a non-metal material such as a concrete, fiberglass, plastic or composite. Utilizing a non-metal material to form the support housing 14 allows for much greater variations in the available materials and methods of construction as well as the appearance of the cooking devices which can be constructed. These materials can be formed to be structurally strong yet sufficiently lightweight to allow portability. In addition, the non-metal materials may be formulated to be non rusting or corroding as well as have excellent weather resistance. These non metal-materials may also be used to construct the supporting base 12 and a substantial portion of the grilling enclosure 16.

Preferably, the support housing 14 is constructed from a relatively thin layer of a concrete material. The concrete material is adapted for use with the heat and stresses associated with outdoor style cooking. However, as mentioned, fiberglass, plastics and even lightweight ceramics and composites which are adapted for outdoor use may also be used. Pigments or colorings and texturing material may be added to the structural material to provide a colored and textured effect. The material is shaped to form the support housing 14 having the desired decorative exterior shape and finish. Preferably, the material is worked into a mold and cured to form the support housing 14.

More preferably, the non-metal material is a lightweight fiber reinforced concrete material such as a glass fiber reinforced concrete (hereinafter referred to as "GFRC"). GFRC formulations are well known in various construction applications, but require particular care when preparing for use with the outdoor cooking device 10 of the present invention. In particular, the formulation must be structurally strong enough to support the grilling enclosure 16, hood 18 and other loads associated with outdoor cooking while formed into sufficiently thin walls as to remain lightweight and portable. In addition, the GFRC material must be capable of being molded or otherwise formed into walls which resist cracking, chipping, crumbling and weathering.

The non-metal material, such as the GFRC, is formulated and then constructed or otherwise formed into the support housing 14. As mentioned, the support housing 14 is preferably a hollow shell type structure with a distinctive shape and exterior finish. The support housing 14 may be a monolithic type structure or alternatively, a number of individual structures or even walls that are coupled together to form the overall support housing. Construction may be accomplished in any number of ways as is known to those of skill in the art of GFRC construction. For example, the support housing may be hand formed over a framed base or alternatively, free sculpted. Preferably, however, the support housing 14 is constructed using a mold, or plurality of molds, configured to the desired shape and including the desired exterior features 36. These shapes and exterior features 36 may be formed to match surrounding furniture and objects, such as plant pots, tables and garden structures, etc.

In one embodiment of construction, the support housing 14 is formed using a single wall mold. The mold is formed to have the desired outer shape and exterior features of the support housing 14. In addition, the mold may be fitted with a particular finish to provide a desired surface finish on the support housing 14. The mold may be made and used as is known to those of skill in the art of molding concrete and particularly, GFRC. The support housing 14 is then formed by applying the non-metal material and particularly, the GFRC, to the mold, allowing it to cure and then releasing the mold. The GFRC is particularly formulated to have a consistency which readily adheres to the walls of the mold and forms a relatively uniform wall thickness.

To enhance portability and reduce costs, the support housing 14 is formed having a relatively thin wall thickness. Preferably, when using a concrete or other non-metal material, a minimum wall thickness of approximately 0.2 inches is required. Although this minimum thickness is not required, it is practical since thinner walls tend to crack and break, a thicker wall may be required depending on the material formulation and the design loads of the cooking device 10. Preferably, the average wall thickness of the support housing is between a minimum of approximately 0.2 inches and approximately 2.5 inches. Although, it may be possible and desirable to have thicker walls at various location, generally, this will not be necessary and only increase the weight of the support housing 14 while decreasing its portability. However, for fixed or semi-portable units, thicker walls may be desirable.

More specifically, the support housing 14 is constructed by applying the GFRC to the mold in a two step process. In the first step, a first or color coat of GFRC is applied to the mold. This first coat is allowed to partially cure and then a second or structural coat is applied over the exterior or first coat. Once the color and structural coats have cured, the formed support housing 14 is removed from the mold. As understood to those of skill in the art, most any combination of coatings and application methods may be used. For example, a single application which incorporates both the color and structural coats as a single coat, or multiple applications of the GFRC may be used to fill the mold.

The first or color coat is particularly formulated to form a unique exterior surface and provide a particular coloring. Coloring may be created through any means but is expected to be accomplished by adding a pigment or plurality of pigments to the pre-cured GFRC mixture. Preferably, the exterior color or exterior coat comprise a number of components which are mixed together with water to form a workable GFRC mixture. For example, a useful mixture includes the following components:

| | Component | % of Total Mix by weight (approx.) |
|---|---|---|
| 1. | Cement | 46.1 |
| 2. | Sand | 36.7 |
| 3. | Water | 11.9 |
| 4. | Curing retardant | 5.0 |
| 5. | Colorants | 0.3 |
| 6. | Water reducer | 0.2 |

Where, the identified components are standard GFRC components as is well known to those of skill in the art. The curing retardant, for example, may be Forton or Polyplex. In addition, the described percentage values are approximate and may easily be altered. For example, the amount of coloring will likely change for every differing application. In addition, a texturing or other material may be added to create a particular exterior characteristic, look or finish. For example, coarse sand foam particles or glass may be added or even a dissolvable salt-like material may be applied to the mold.

The components are mixed together, such as in a cement mixer and applied to the walls of the mold using a brush or trowel. Preferably, the color coat is first applied to a generally uniform thickness of approximately $\frac{1}{8}$ to $\frac{3}{16}$ of an inch. Depth tools, such as a stick pin or other probe, may be used to ensure a consistent thickness of the GFRC material. The mixture may also be applied using any method or tools as would be obvious to one of skill in the art of working with such materials. For example, the mixture may be applied by hand, poured or even sprayed onto the mold.

After the first coat slightly sets, the structural coat is applied. The time required to allow the material comprising the first or color coat to set will vary greatly depending on the formulation, humidity and temperature. For the described GFRC formulation, an average humidity and temperature, a curing period of between approximately 20 to 30 minutes is expected. Curing may also be altered by controlling the humidity and temperature and use of accelerators.

Similar to the first coat, the structural coat comprises a number of components which are mixed together with water to form a second workable GFRC mixture. However, unlike the color coat, the structural coat includes a large quantity of glass fibers. The glass fibers create the unique strength and properties of the GFRC. Coloring may not be required in this interior coat. An example of a useful mixture for a structural coat includes:

| | Component | % of Total Mix by weight (approx.) |
|---|---|---|
| 1. | Cement | 44.7 |
| 2. | Sand | 35.8 |
| 3. | Water | 10.7 |
| 4. | Curing retardant | 4.8 |
| 5. | Fiber | 3.9 |
| 6. | Water reducer | 0.2 |

These percentage values are also approximate and may be altered as is known to those of skill in the art.

Similar to the color coat, the components of the structural coat are mixed together, such as in a cement mixer and then applied in a generally uniform thickness to the slightly cured exterior coat. Preferably, this structural coat is applied with an average thickness of approximately $\frac{1}{8}$ to $\frac{3}{8}$ of an inch. Depth tools may again be used to assure a consistent thickness of the material. The structural coat may be applied through use of a chopper type spray gun which applies the glass and cement mix together. The use of the spray gun allows a very quick application of the second coat. However, the structural coat may also be applied by hand using a brush or trowel or through any other method as is known to those of skill in the art. Similar to the color coat, the structural coats is allowed to cure. Generally, it is expected that an average curing time of between 2 hours to over 8 hours is required. After curing, the mold is removed.

Figure 6A:
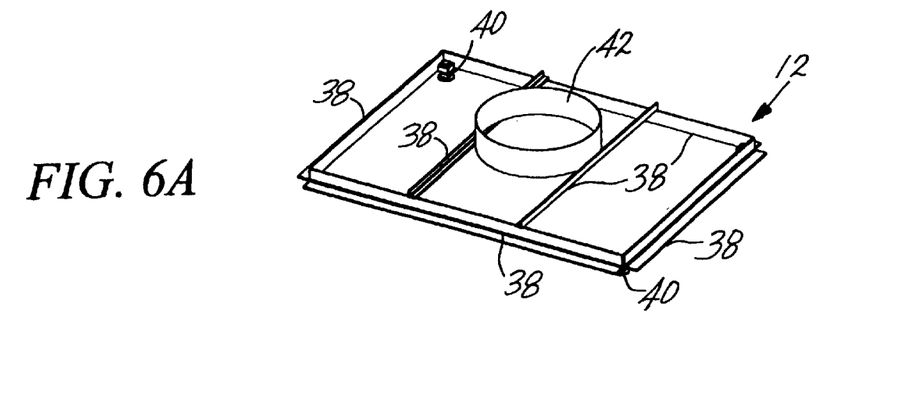
FIG. 6A is a perspective view of an embodiment of a supporting base assembly constructed according to the principles of the present invention.
Figure 6B:
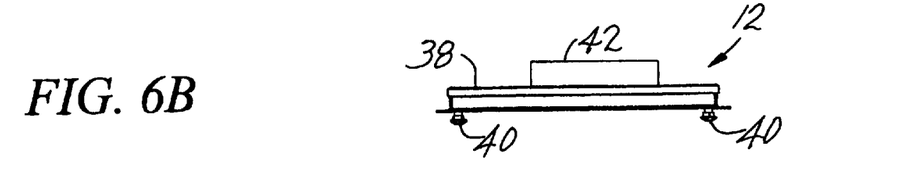
FIG. 6B is a side view of the supporting base of FIG. 6A.

Referring now to FIGS. 6A and 6B, the supporting base 12 will be described in greater detail. As shown, the supporting base 12 is a framed member adapted for placement on the ground or similar supporting surface. Preferably, the framed base 12 is constructed to both support the cooking device 10 as well as couple with the support housing 14. The base 12 includes an outer frame structure 38 and may include internal frame members. The flame structure 38 may be constructed from metal, such as a mild steel or aluminum.

The base 12 is actually supported on the ground by a plurality of spaced apart ground engaging pads 40. These pads 40 may be any conventional pads, supports, casters or wheels, including adjustable elevation or leveling support members. The frame 38 is flanged or otherwise adapted to support the support housing 14, the foot pads 40 as well as to couple with the support housing. The frame member 38 may be bolted, screwed or otherwise fastened to the support housing 14. However, the base 12 may be molded as an integral part of the support housing 14. Alternatively, the support housing 14 may be formed to include an integrally formed base and not require a separate metal structure. In this configuration, the support pads 40 may be secured directly to the non-metal supporting structure. A fuel canister support 42 is coupled to the frame 38. Preferably, this support 42 is adapted to support a conventional propane tank.

Figure 7:
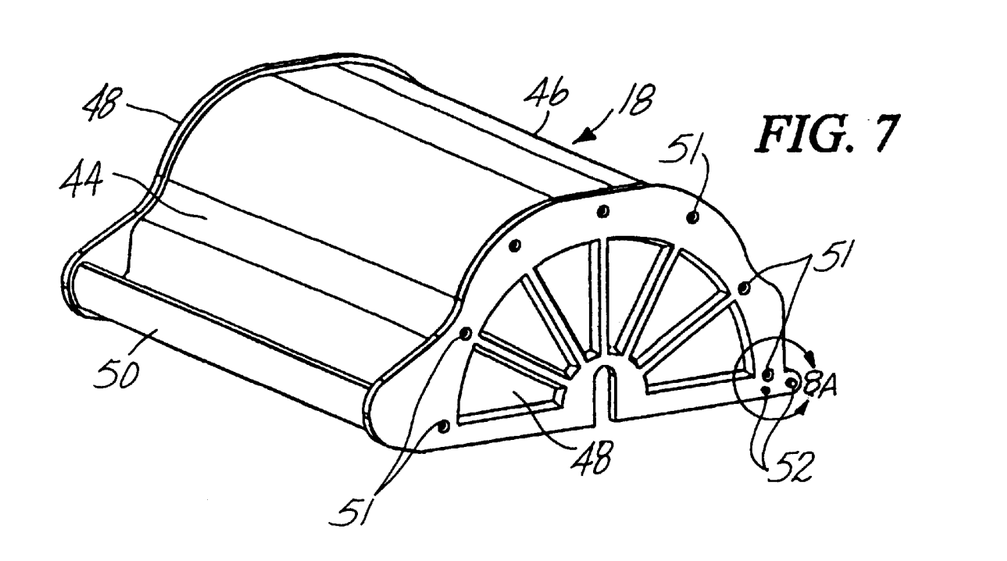
FIG. 7 is a perspective view of an embodiment of a hood assembly constructed according to the principles of the present invention.
Figure 8A:
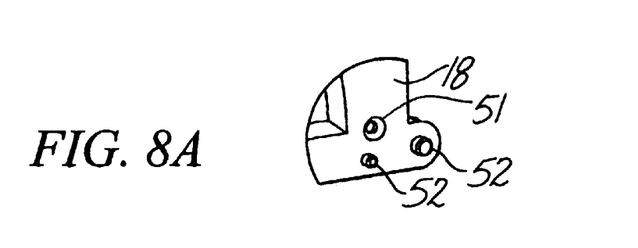
FIG. 8A is a partial perspective view of the hood assembly of FIG. 7, showing an embodiment of a portion of a hinge assembly constructed according to the principles of the present invention.
Figure 8B:
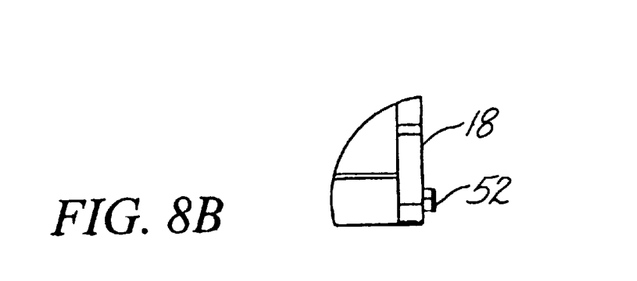
FIG. 8B is a partial front view of the hood assembly of FIG. 7, showing a portion of the hinge assembly.

Referring now to FIGS. 7 through 8, the hood assembly 18 will be described in greater detail. As previously described, the hood 18 is pivotally coupled over the grilling enclosure 16 and adapted to cover the cooking surface (reference numeral 22 in FIG. 2). The illustrated hood 18 has a front surface 44 and rear surface 46 which extend between two spaced apart sides 48. A handle 50 is provided to facilitate opening and closing over the cooking surface 22. The sides 48 and the handle 50 are coupled to the front and rear surfaces 44 and 46 through fasteners 51. The fasteners 51 are threaded bolt-type fasteners but may also be screws, rivets or even be a welded seam. This hood assembly 18 is only one of an almost endless variety of possible configurations which may be used, as would be known to those of skill in the art. For example, the hood 18 may be spherically shaped or may be constructed as a one piece cast component.

As is conventional, the hood assembly 18 defines a large volume to allow substantial room over the cooking surface 22 when in the closed position. In addition, the hood 18 is designed to allow full access to the cooking surface 22 when in the open position. The hood 18 may be constructed from most any material, including the non-metal materials described above, which can withstand the cycles and temperatures of barbecue style cooking. However, the hood 18 is preferably made from metal components, such as an aluminum, a steel or a combination of components having different materials.

A pair of spaced apart hinge axes 52 extend outwardly from both sides 48 of the hood assembly 18. Each pair of hinge axes 52 are generally parallel and the respective pairs are aligned along a common respective axis. Each hinge axis 52 is a shaft section bolted or otherwise secured to the sides 48 of the hood 18.

Figure 9A:
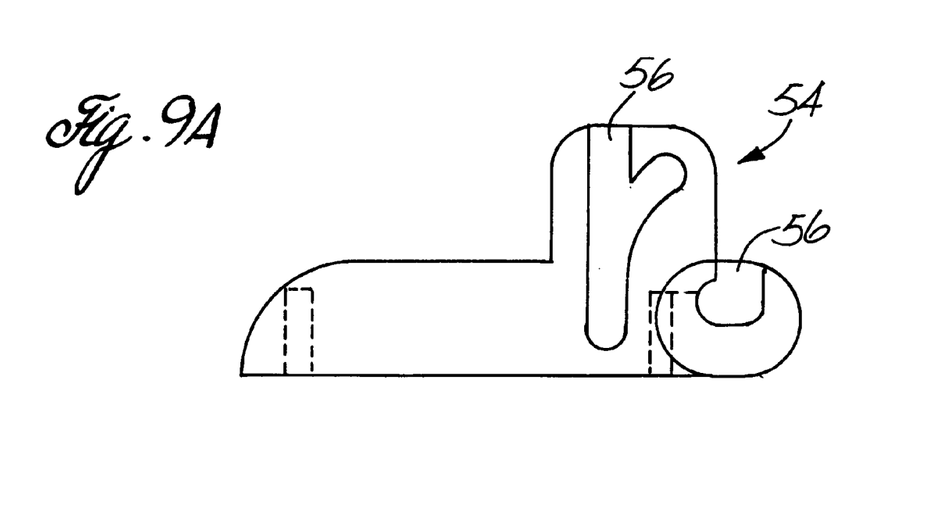
FIG. 9A is an inward side view of an embodiment of a hinge portion constructed according to the principles of the present invention.
Figure 9B:
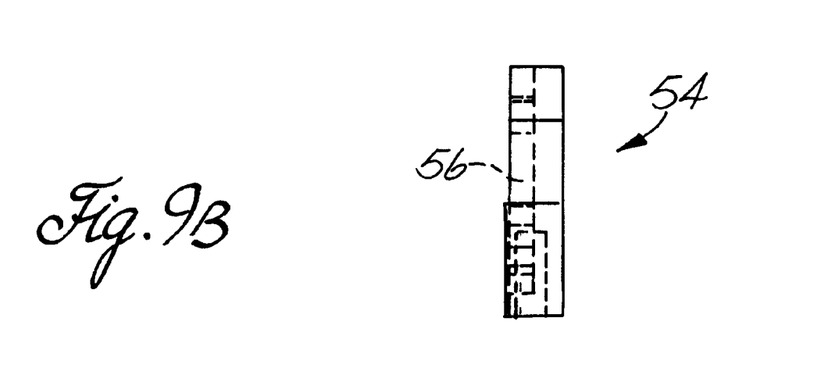
FIG. 9B is a rear view of the hinge portion of FIG. 9A.

A hinge assembly 54, as best illustrated in FIGS. 9A and 9B, is used to pivotally couple the hood 18 over the grilling enclosure 16. Each hinge assembly 54 is secured to the grilling enclosure 16 about both sides 48 of the hood 18. The hinge axes 52 protruding from the hood 18 are pivotally received within a pair of spaced apart grooves 56 within each hinge assembly 54. The combination of two hinge axes 52 within two separate grooves 56 forms a unique hinge arrangement. More specifically, this unique hinge assembly 54 allows the hood 18 to be pivoted opened and closed over the cooking surface 22 as well as removed and reattached without the use of tools or other equipment. This advantageously allows the present barbecue 10 to be used as both an open cooking grill without the common obstructions of a conventional hood and as a conventional closed hood cooking barbecue. In particular, the double axis hinge assembly 52 allows the hood to be lifted straight up and off of the grilling enclosure 16 and then reattached by simply placing the hinge axes 52 back into the respective grooved slots 56 hinge assembly.

Figure 10:
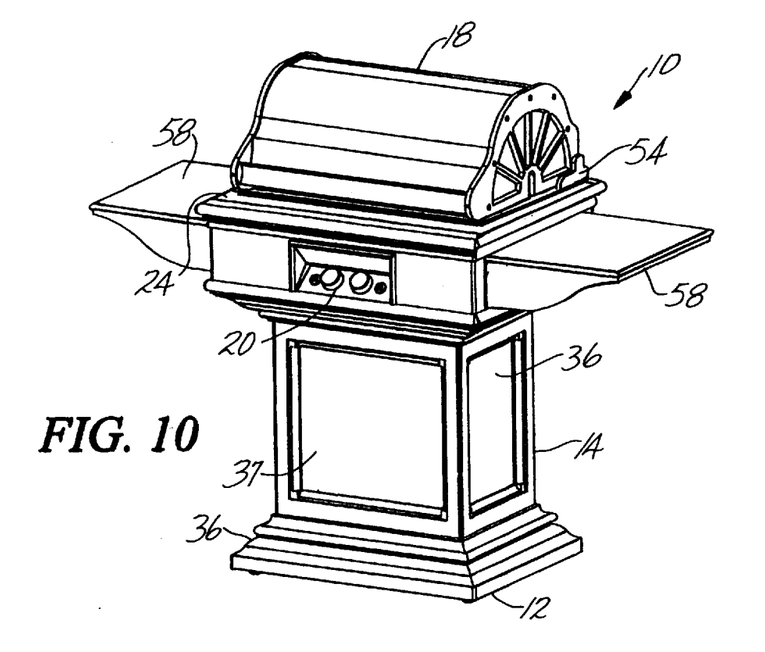
FIG. 10 is a perspective view of the cooking device of FIG. 1 showing an embodiment of side tables constructed according to the principles of the present invention coupled to the support structure.

Referring now to FIG. 10, a side shelf or table 58 is coupled to each side of the support housing 14. Each side shelf 58 is provided to increase the size of the available working surface 24A. Although shown with two shelves 58, a single shelf may be supplied, or an additional front shelf may also be provided. The shelves 58 are preferably made from the same non-metal material as the support housing 14 and provided to aesthetically match. However, the shelves 58 may be made from most any material and may be specifically configured. For example, one shelf 58 may be configured with cup or condiment holders. The shelves 58 may be removably or permanently secured to the support housing 14 using most any means, such as fasteners. In one embodiment, the support housing 14 is fitted with appropriately located threaded bores for receiving these shelf fasteners.

Figure 11:
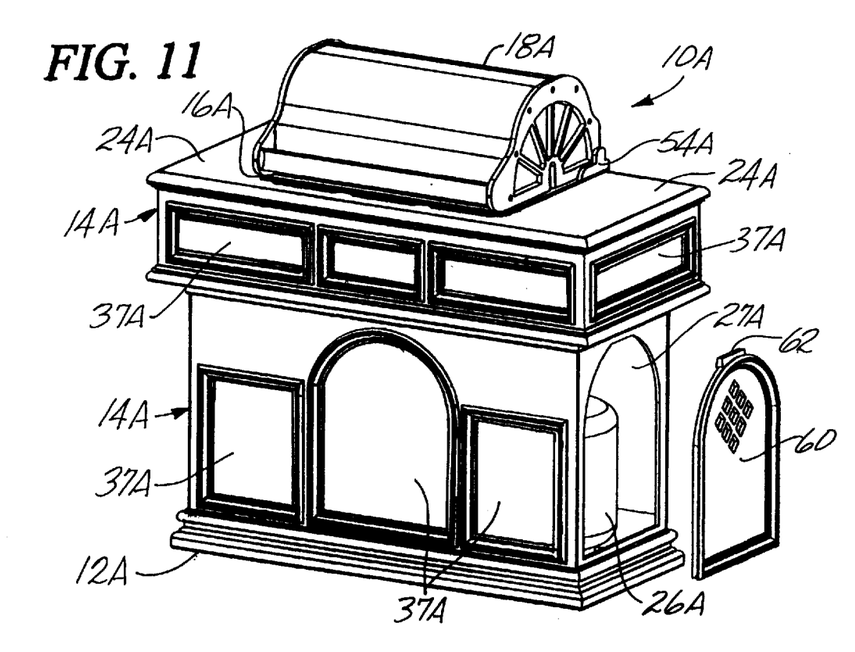
FIG. 11 is a perspective view of an alternative embodiment of an outdoor cooking device constructed according to the principles of the present invention.

Referring now to FIG. 11, an alternative embodiment of an outdoor cooking device constructed in accordance with the principles of the present invention is shown. In this embodiment, like features to those of the previous embodiment are designated by like reference numerals, succeeded by the reference numeral "A". As shown, an outdoor cooking device 10A includes a supporting base 12A coupled to a support housing 14A which extends upwardly to support a grilling enclosure 16A and form a working surface 24A. In this configuration, the supporting base 14A is relatively larger and provides a substantial working surface 24A adjacent the cooking surface (reference numeral 22 in FIG. 2). A hood 18A is pivotally coupled over the grilling enclosure 16A through hinge assemblies 54A. As with the previously described embodiments, the present embodiment has a supporting structure 14A with a decorative exterior shape and appearance.

An access door 60 is provided to provide access to the opening 27A. The access door 60 is removably coupled to the support housing 14A through an access hinge 62. The access hinge 62 allows the access door 60 to be both pivoted open and removed. Alternatively, the access hinge 62 may merely be a tabbed portion which securely fits into a groove within the opening 27A. Preferably, the access door 60 is made from the same non-metal material as the support housing 14A and includes the same exterior configuration and features. Thus, the access door 62 is constructed to appear as a continuous part of the support housing 14A and to provide access into the hollow interior. When the support housing 14A comprises a plurality of structural components, a plurality of access doors 60 may be provided to allow access within each independent structure. Alternatively, a plurality of access doors 60 may be provided in a single monolithic support housing. For example, an access door 61 may be provided to hide the burner controls (not shown).

Figure 12:
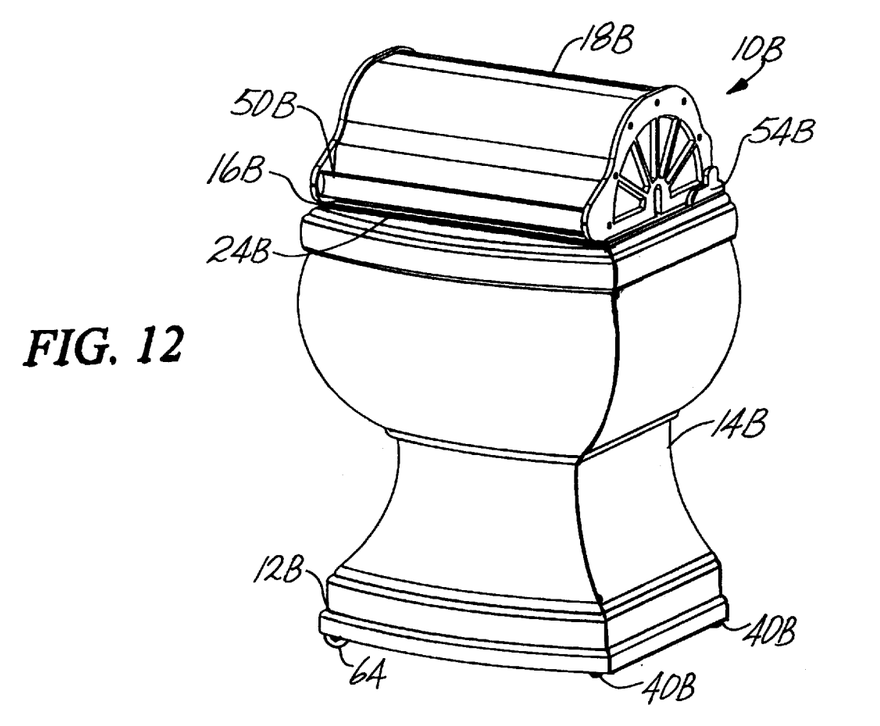
FIG. 12 is a perspective view of another alternative embodiment of an outdoor cooking device constructed according to the principles of the present invention.

FIG. 12 illustrates another alternative embodiment of an outdoor cooking device constructed in accordance with the principles of the present invention. In this embodiment, like features to those of the previous embodiment are designated by like reference numerals, succeeded by the reference numeral "B". As illustrated, the outdoor cooking device 10B includes a supporting base 12B coupled to a support housing 14B which extends upwardly to support a grilling enclosure 16B and form a working surface 24B. However, in this embodiment, the support housing 14B and the base 12B are one molded unit. A hood 18B is pivotally coupled over the grilling enclosure 16B through hinge assemblies 54B. As with the previously described embodiments, the present embodiment has a supporting structure 14B with a decorative exterior shape and appearance. As illustrated, the cooking device 10B is configured for conventional 'charcoal' type cooking and thus, no burner controls are necessary or shown.

A pair of wheels 64 are rotatably coupled to the base assembly 12B to facilitate transportation and portability of the cooking device 10B. Preferably, the wheels 64 are spaced apart along a common side of the base 12B as is conventionally known. In this fashion, the cooking device 10B may be slightly tilted off of the opposing foot pads 40B and rolled with the wheels 64. Alternatively, wheels 64 may be placed at all of the corners of the base structure 12B to facilitate transportation. The wheels 64 may be of any type or configuration as is well known and may even be engageable so as to retract them after transporting the cooking device 10B. It is expected, that with the larger and heavier configurations of the present cooking device 10B, a plurality of wheels will be used to both support the device and provide portability.

It will be understood that various modifications and alternatives can be made to the present invention herein disclosed without departing from the spirit and scope thereof. For example, various types, combinations and formulations of lightweight non-metal materials may be used and these materials may be used for different portions of the barbecue. Also, various modifications may be made in the size, thickness, shape, diameter and configuration of the parts and their interaction as well as various overall configurations, including most any variation of decorative forms. Therefore, the above description should not be construed as limiting the invention, but merely an exemplification of preferred embodiments thereof. Those of skill in the art will envision other modifications within the scope and spirit of the present invention as defined by the claims appended hereto.

What is claimed is:

1. An outdoor cooking device for the preparation and cooking of foods, the cooking device comprising:
    a grilling enclosure having a cooking surface and a hood assembly;
    a supporting base; and
    a hollow support structure extending between the base and the grilling enclosure and adapted for supporting the grilling enclosure;
    wherein the grilling enclosure, supporting base, and support structure are comprised of glass fiber reinforced concrete.

2. An outdoor cooking device as recited in claim 1, and further comprising a side table coupled to the support structure.

3. An outdoor cooking device as recited in claim 2 wherein the side table comprises a material substantially equivalent to the support structure.

4. An outdoor cooking device as recited in claim 1 wherein the support structure comprises a decorative outer surface.

5. An outdoor cooking device as recited in claim 4 wherein the supporting base and the support structure comprises a substantially contiguous unitary piece of the non-metal material.

6. A portable outdoor cooking device for the preparation and cooking of foods, the cooking device comprising:
    a supporting base;
    a grilling enclosure having a cooking grill and a hingably coupled hood; and
    a hollow support housing substantially surrounding the support base and extending upwardly to support and surround at least a portion of the grilling enclosure, the support housing being configured to form a working surface adjacent the grill;
    wherein the support base, grilling enclosure, and support housing are comprised of glass fiber reinforced concrete.

7. A portable cooking device as recited in claim 6 wherein the glass fiber reinforced concrete has been colored.

8. A portable cooking device as recited in claim 6, wherein the support housing further comprises an access door.

9. A portable cooking device as recited in claim 8 wherein the access door comprises a material substantially similar to the support housing.

10. A portable cooking device as recited in claim 6 wherein the support housing comprises a decoratively configured exterior.

11. A portable cooking device as recited in claim 6 wherein the support housing comprises a one-piece molded structure.

12. A portable gas barbecue for the preparation and cooking of foods, the barbecue comprising:
    a grilling enclosure having a cooking surface;
    a hood having a front and rear surface extending between two spaced apart sides and configured for covering the cooking surface;
    a pair of spaced apart and axially aligned hinge assemblies pivotally coupling the hood over the grilling enclosure, the hinge assemblies adapted to allow the hood to be pivoted open and closed over the grilling enclosure as well as removed and reattached;
    a frame structure forming a support base; and
    a support housing coupled to the frame structure and extending upwardly to support and substantially surround the grilling enclosure and form a working surface adjacent the cooking surface, the support housing being a walled enclosure of a glass fiber reinforced concrete material.

13. The portable gas barbecue as recited in claim 12 wherein the walled enclosure comprises an average wall thickness of less than 0.75 inch.

14. The portable gas barbecue as recited in claim 13 wherein each hinge assembly comprises a hinge bracket having a pair of grooved paths for receiving a pair of spaced apart hinge posts extending outwardly from each side of the hood.

15. The portable gas barbecue as recited in claim 14 wherein the support housing comprises a plurality of structures.

16. The portable gas barbecue as recited in claim 12, and further comprising a plurality of wheels coupled to the frame structure for rotatable contact with the ground.

17. An outdoor cooking device for the preparation and cooking of foods, the outdoor cooking device comprising:
    a structure configured to facilitate cooking of food; and
    wherein the enclosure is comprised substantially of glass reinforced concrete, the use of said glass reinforced concrete facilitating the fabrication of an outdoor cooking device which is durable in construction and which is also light in weight.

* * * * *